M. J. WYGONIK.
NUT LOCK.
APPLICATION FILED APR. 29, 1909.

930,016.

Patented Aug. 3, 1909.

Witnesses
Samuel Payne
K. H. Butler

Inventor
M. J. Wygonik,
By H. C. Evert
Attorneys

UNITED STATES PATENT OFFICE.

MARTIN J. WYGONIK, OF NATRONA, PENNSYLVANIA.

NUT-LOCK.

No. 930,016.      Specification of Letters Patent.      Patented Aug. 3, 1909.

Application filed April 29, 1909. Serial No. 492,927.

*To all whom it may concern:*

Be it known that I, MARTIN J. WYGONIK, a citizen of the United States of America, residing at Natrona, in the county of Allegheny and State of Pennsylvania, have invented certain new and useful Improvements in Nut-Locks, of which the following is a specification, reference being had therein to the accompanying drawing.

This invention relates to nut locks, and the objects of the invention are, first to provide positive and reliable means for locking a nut upon a bolt, whereby vibrations of the bolt will not loosen or dislodge the nut; second, to provide a nut lock that can be advantageously used in connection with rail joints, rolling stock, bridges and structures subject to vibrations; third, to provide a simple and durable nut lock that can be easily and quickly placed in position by unskilled labor; and fourth, to provide a nut lock that will not injure or mar a bolt and nut, thus permitting of a bolt and nut being again used after the lock is manually released.

I attain the above objects by a nut locking device that will be hereinafter described in detail and then specifically pointed out in the appended claim.

Figure 1:
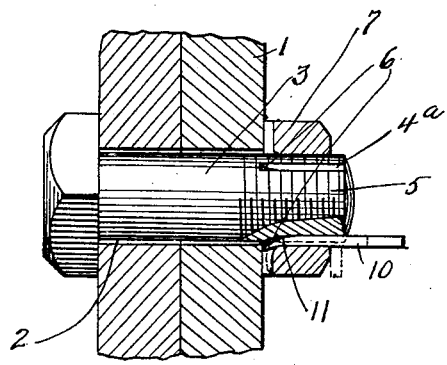
Figure 2:
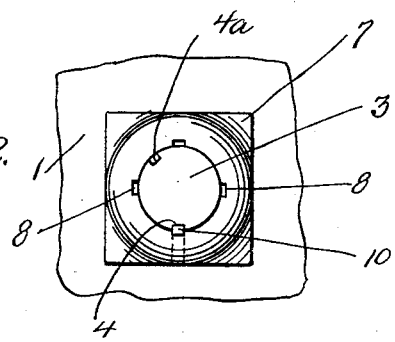
Figure 3:
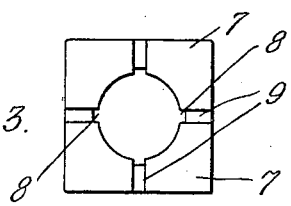
Figure 4:
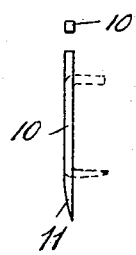

Referring to the drawing forming part of this application, Figure 1 is a longitudinal sectional view of a nut lock constructed in accordance with my invention, Fig. 2 is a front elevation of the same, Fig. 3 is a rear elevation of a nut, Fig. 4 is an elevation of a locking pin.

In the accompanying drawings, 1 designates a piece of material provided with alining openings 2 through which extends the bolt 3. The threaded end of this bolt is provided with two longitudinal grooves 4 and 4$^a$ intersecting the threads 5 of the bolt, said grooves having the inner ends thereof beveled, as at 6, toward the periphery of the bolt 3. The groove 4$^a$ is disposed approximately at an angle of one hundred thirty-five degrees relative to the groove 4 and the longitudinal axis of the bolt 3, and the object of arranging the grooves in this manner will hereinafter appear.

7 designates a nut having the bore thereof provided with a plurality of longitudinal equally spaced grooves 8, these grooves intersecting the threads of the nut. The rear face of the nut 7 is provided with a plurality of radially disposed grooves 9, the inner ends of said grooves terminating at the rear ends of the grooves 8, while the outer ends of the grooves 9 terminate at the sides of the nut 7.

10 designates a pin made of malleable metal, said pin being rectangular in cross section with the cross sectional area thereof corresponding to the combined cross sectional area of either the groove 4 or 4$^a$ and one of the grooves 8, when two of these grooves register. One end of the pin 10 is beveled, as at 11, for a purpose that will hereinafter appear.

After the nut 7 has been screwed upon the bolt 3, and tightened thereon, so that one of the grooves 8 of the nut registers with either the groove 4 or 4$^a$ of the bolt, the pin 10 is driven into the registering grooves. As the beveled end 11 of the pin impinges the beveled end 6 of the groove 4, the beveled end of the pin is deflected into one of the grooves 9, said pin becoming clenched therein, whereby it cannot be dislodged by a jarring movement imparted to the bolt 3. The outer end of the pin 10 is adapted to be bent downwardly, as shown in Fig. 1 of the drawings, thereby locking the nut 7 relative to the bolt 3.

The location of the grooves 4 and 4$^a$ in the bolt 3 permits of the nut being thoroughly tightened upon the bolt, since one of the grooves 4 or 4$^a$ can be readily moved to register with one of the grooves 8 and permit of the pin 10 being driven into the registering grooves.

While in the drawings there is illustrated the preferred embodiment of my invention, I would have it understood that the structural details thereof can be varied or changed without departing from the spirit of the invention.

Having now described my invention, what I claim as new, is:—

In a nut lock, the combination with pieces of material, of a bolt extending through said pieces of material, said bolt having longitudinal grooves formed in the threaded end thereof with the inner ends of said grooves beveled toward the periphery of said bolt and said grooves disposed at an angle approximately one hundred thirty-five degrees relative to each other and to the longitudinal axis of said bolt, a nut adapted to screw upon said bolt, said nut having the threaded bore thereof provided with a plurality of equally spaced longitudinal grooves, one of said grooves being adapted to register with one of the grooves of said bolt, the rear face of said nut having radially disposed grooves formed therein with the inner ends of said grooves communicating with the longitudinal grooves of said nut and the outer ends of said grooves terminating at the sides of said nut, and a malleable pin adapted to be driven into registering grooves of said bolt and nut, said pin having the end thereof beveled to be deflected by the beveled end of the bolt grooves, while the opposite end of said pin is adapted to be bent to engage said nut, substantially as described.

In testimony whereof I affix my signature in the presence of two witnesses.

MARTIN J. WYGONIK.

Witnesses:
O. H. RABSIAG,
A. J. TRIGG.